US012565446B2

(12) United States Patent
Medwick et al.

(10) Patent No.: US 12,565,446 B2
(45) Date of Patent: Mar. 3, 2026

(54) ARTICLE COATED WITH A SOLAR CONTROL COATING HAVING SOLAR PROTECTION AND THERMAL INSULATION

(71) Applicant: Vitro Flat Glass LLC, Cheswick, PA (US)

(72) Inventors: Paul A. Medwick, Wexford, PA (US); Andrew V. Wagner, Pittsburgh, PA (US); Jose Luis Tavares Cortes, Apodaca (MX); Arturo Si Ming Lamshing Tai, Monterrey (MX); Maryanne Griffin, Apollo, PA (US)

(73) Assignee: Vitro Flat Glass LLC, Cheswick, PA (US)

( * ) Notice: Subject to any disclaimer, the term of this patent is extended or adjusted under 35 U.S.C. 154(b) by 0 days.

(21) Appl. No.: 17/539,267

(22) Filed: Dec. 1, 2021

(65) Prior Publication Data

US 2022/0204399 A1 Jun. 30, 2022

Related U.S. Application Data

(60) Provisional application No. 63/130,953, filed on Dec. 28, 2020.

(51) Int. Cl.
| | |
|---|---|
| *B32B 15/04* | (2006.01) |
| *B32B 17/06* | (2006.01) |
| *C03C 17/36* | (2006.01) |
| *C03C 17/34* | (2006.01) |

(52) U.S. Cl.
CPC ........ *C03C 17/366* (2013.01); *C03C 17/3618* (2013.01); *C03C 17/3626* (2013.01); *C03C 17/3642* (2013.01); *C03C 17/3649* (2013.01);

*C03C 17/3435* (2013.01); *C03C 2217/27* (2013.01); *C03C 2217/281* (2013.01)

(58) Field of Classification Search
CPC ...................................................... C03C 17/366
USPC .................................................... 428/428, 432
See application file for complete search history.

(56) References Cited

U.S. PATENT DOCUMENTS

| | | | |
|---|---|---|---|
| 4,193,236 | A | 3/1980 | Mazzoni et al. |
| 4,379,040 | A | 4/1983 | Gillery |
| 4,464,874 | A | 8/1984 | Shea, Jr. et al. |
| 4,466,562 | A | 8/1984 | DeTorre |
| 4,671,155 | A | 6/1987 | Goldinger |
| 4,746,347 | A | 5/1988 | Sensi |

(Continued)

FOREIGN PATENT DOCUMENTS

| | | |
|---|---|---|
| AU | 680786 B2 | 12/1996 |
| WO | 2014139755 A1 | 9/2014 |

(Continued)

*Primary Examiner* — Lauren R Colgan
(74) *Attorney, Agent, or Firm* — The Webb Law Firm

(57) ABSTRACT

A coated article includes a substrate having a first surface and a second surface opposite the first surface with a solar control coating applied over the first surface or the second surface of the substrate. The solar control coating includes a first silicon aluminum nitride or silicon nitride layer over at least a portion of the substrate; a nickel-chromium alloy layer over and in direct contact with at least a portion of the silicon aluminum nitride or silicon nitride layer; and a second silicon aluminum nitride or silicon nitride layer over and in direct contact with at least a portion of the nickel-chromium alloy layer.

14 Claims, 2 Drawing Sheets

(56)  References Cited

U.S. PATENT DOCUMENTS

| | | | |
|---|---|---|---|
| 4,792,536 A | 12/1988 | Pecoraro et al. | |
| 4,861,669 A | 8/1989 | Gillery | |
| 4,898,789 A | 2/1990 | Finley | |
| 4,898,790 A | 2/1990 | Finley | |
| 4,900,633 A | 2/1990 | Gillery | |
| 4,920,006 A | 4/1990 | Gillery | |
| 4,938,857 A | 7/1990 | Gillery | |
| 5,030,593 A | 7/1991 | Heithoff | |
| 5,030,594 A | 7/1991 | Heithoff | |
| 5,088,258 A | 2/1992 | Schield et al. | |
| 5,106,663 A | 4/1992 | Box | |
| 5,240,886 A | 8/1993 | Gulotta et al. | |
| 5,328,768 A | 7/1994 | Goodwin | |
| 5,385,872 A | 1/1995 | Gulotta et al. | |
| 5,393,593 A | 2/1995 | Gulotta et al. | |
| 5,492,750 A | 2/1996 | Shumaker, Jr. et al. | |
| 5,688,585 A * | 11/1997 | Lingle | C03C 17/3618 359/359 |
| 5,837,108 A * | 11/1998 | Lingle | C03C 17/3681 204/192.15 |
| 6,159,607 A * | 12/2000 | Hartig | C03C 17/3618 427/166 |
| 6,524,714 B1 * | 2/2003 | Neuman | C03C 17/3435 427/419.7 |
| 6,627,317 B2 * | 9/2003 | Wang | C03C 17/36 427/166 |
| 6,667,121 B2 * | 12/2003 | Wang | C03C 17/366 428/428 |
| 6,716,532 B2 * | 4/2004 | Neuman | C03C 17/3435 428/428 |
| 6,800,179 B2 * | 10/2004 | Wang | C03C 17/3435 204/192.15 |
| 6,852,419 B2 * | 2/2005 | Stachowiak | B32B 17/10174 428/428 |
| 6,890,659 B2 * | 5/2005 | Stachowiak | C03C 17/3649 428/428 |
| 6,926,967 B2 * | 8/2005 | Neuman | C03C 17/3435 428/432 |
| 7,294,402 B2 * | 11/2007 | Laird | C03C 17/3652 428/428 |
| 7,592,068 B2 * | 9/2009 | Disteldorf | C03C 17/36 428/432 |
| 8,679,634 B2 * | 3/2014 | Imran | C03C 17/3681 428/689 |
| 8,703,281 B2 * | 4/2014 | Unquera | C03C 17/3626 428/220 |
| 9,150,003 B2 * | 10/2015 | Dietrich | C03C 17/366 |
| 9,561,981 B2 | 2/2017 | Mahieu et al. | |
| 10,214,956 B2 * | 2/2019 | Tucker | C23C 14/185 |
| 2003/0180546 A1 * | 9/2003 | Stachowiak | G02B 5/205 428/689 |
| 2004/0058169 A1 | 3/2004 | Wang et al. | |
| 2004/0137234 A1 * | 7/2004 | Stachowiak | C03C 17/3435 428/428 |
| 2004/0166328 A1 * | 8/2004 | Stachowiak | C03C 17/3652 428/428 |
| 2006/0159933 A1 * | 7/2006 | Disteldorf | C03C 17/36 204/192.15 |
| 2009/0324934 A1 * | 12/2009 | Blacker | C03C 17/366 428/333 |
| 2012/0177899 A1 * | 7/2012 | Unquera | C03C 17/3618 428/428 |
| 2014/0072784 A1 * | 3/2014 | Dietrich | C03C 17/3639 428/428 |
| 2016/0016846 A1 | 1/2016 | Canova et al. | |
| 2019/0204480 A1 | 7/2019 | Thiel et al. | |
| 2020/0216353 A1 | 7/2020 | Polcyn et al. | |
| 2020/0369561 A1 | 11/2020 | Misra et al. | |

FOREIGN PATENT DOCUMENTS

| | | | |
|---|---|---|---|
| WO | 2019053741 A1 | 3/2019 | |
| WO | 2020012502 A1 | 1/2020 | |
| WO | 2020198495 A1 | 10/2020 | |

* cited by examiner

ARTICLE COATED WITH A SOLAR CONTROL COATING HAVING SOLAR PROTECTION AND THERMAL INSULATION

CROSS REFERENCE TO RELATED APPLICATION

This application claims priority to U.S. Provisional Application No. 63/130,953, filed on Dec. 28, 2020, the disclosure of which is incorporated by reference in its entirety.

BACKGROUND OF THE INVENTION

Field of the Invention

This invention relates generally to articles coated with a solar control coating.

Description of Related Art

Solar control coatings are known in the fields of architectural and vehicle transparencies. These solar control coatings block or filter selected ranges of electromagnetic radiation, such as, in the range of solar infrared or solar ultraviolet radiation, to reduce the amount of solar energy entering the vehicle or building. This reduction of solar energy transmittance helps reduce the load on the cooling units of the vehicle or building.

In automotive applications, the transparency, when used as a windshield or other selected portions of automotive glazings (e.g., the side glazing adjacent in the automobile's front seat position), typically requires a relatively high visible light transmittance, such as, greater than 70 percent or greater than 75 percent, to allow the automobile driver to see out of the vehicle. For architectural applications, the visible light transmittance can be lower. In some architectural applications, it may be desirable to have a reflective outer surface so as to decrease visibility into the building to retain as much privacy as possible, while still allowing visible light to enter the building and also allowing the workers inside the building to see out. Also, these transparencies are typically tempered or heat treated for increased safety.

In one known architectural transparency, a heat strengthened glass substrate is coated with a solar control coating having an absorber material, to absorb visible light to darken the window. This transparency also includes a relatively thick, continuous, infrared reflective metal layer to reflect solar energy, such as solar infrared energy. However, a problem with this known transparency is that the glass substrate must be cut to a desired shape and tempered before the coating is applied. If the coating is applied before the glass substrate is tempered, the resultant coating can become hazy during the tempering process. This haze is aesthetically undesirable. In other cases, when applying the coating prior to tempering the glass substrate, the aesthetics (i.e., the reflected and/or transmitted color) and/or solar control performance can exhibit an unacceptably large change after tempering.

It would be desirable to produce a solar control coating with a specified reflectance and/or transmittance, in which the resulting optical, solar-control performance, and aesthetic properties could be maintained before and after tempering.

SUMMARY OF THE INVENTION

The invention relates to a coated article comprising a substrate. The substrate comprises a first surface and a second surface opposite the first surface. A solar control coating is applied over the first surface or second surface of the substrate. The solar control coating comprises a first silicon aluminum nitride layer over at least a portion of the substrate; a nickel-chromium alloy layer over and in direct contact with at least a portion of the silicon aluminum nitride layer; and a second silicon aluminum nitride layer over and in direct contact with at least a portion of the nickel-chromium alloy layer.

The invention also relates to a coated article consisting of a glass substrate; and a solar control coating applied over the glass substrate. The solar control coating comprises a first silicon aluminum nitride layer over at least a portion of the substrate; a nickel-chromium alloy layer over and in direct contact with at least a portion of the silicon aluminum nitride layer; and a second silicon aluminum nitride layer over and in direct contact with at least a portion of the nickel-chromium alloy layer.

The invention further relates to a method of making a coated article. A substrate comprising a first surface and a second surface opposite the first surface is provided. A solar control coating applied over the first surface or second surface of the substrate is formed. The solar control coating comprises a first silicon aluminum nitride layer over at least a portion of the substrate; a nickel-chromium alloy layer over and in direct contact with at least a portion of the silicon aluminum nitride layer; and a second silicon aluminum nitride layer over and in direct contact with at least a portion of the nickel-chromium alloy layer.

The invention further relates to a method of making a coated article. A substrate comprising a first surface and a second surface opposite the first surface is provided. A solar control coating applied over the first surface or second surface of the substrate is formed. The solar control coating consists of a first silicon aluminum nitride layer over at least a portion of the substrate; a nickel-chromium alloy layer over and in direct contact with at least a portion of the silicon aluminum nitride layer; and a second silicon aluminum nitride layer over and in direct contact with at least a portion of the nickel-chromium alloy layer.

DESCRIPTION OF THE INVENTION

Figure 1:
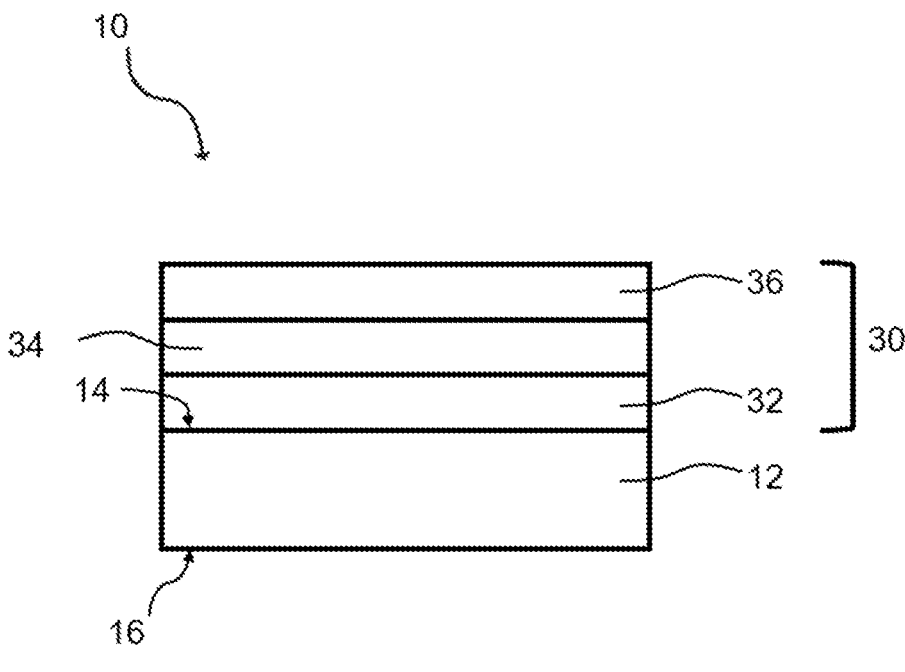
FIG. 1 is a side view (not to scale) of a coated article according to an example of the invention.

As used herein, spatial or directional terms, such as "left", "right", "inner", "outer", "above", "below", and the like, relate to the invention as it is shown in the drawing figures. However, it is to be understood that the invention can assume various alternative orientations and, accordingly, such terms are not to be considered as limiting. Further, as used herein, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 3.3, 4.7 to 7.5, 5.5 to 10, and the like. "A" or "an" refers to one or more.

Further, as used herein, the terms "formed over", "deposited over", or "provided over" mean formed, deposited, or provided on but not necessarily in contact with the surface. For example, a coating layer "formed over" a substrate does not preclude the presence of one or more other coating layers or films of the same or different composition located between the formed coating layer and the substrate. Additionally, all documents, such as, but not limited to, issued patents and patent applications, referred to herein are to be considered to be "incorporated by reference" in their entirety. As used herein, the term "film" refers to a coating region of a desired or selected coating composition. A "layer" can comprise one or more "films", and a "coating" or "coating stack" can comprise one or more "layers".

For purposes of the following discussion, the coated articles described herein may be discussed with reference to use with an architectural transparency, such as, but not limited to, an insulating glass unit (IGU). As used herein, the term "architectural transparency" refers to any transparency located on a building, such as, but not limited to, windows and sky lights. However, it is to be understood that the coated articles described herein are not limited to use with such architectural transparencies but could be practiced with transparencies in any desired field, such as, but not limited to, laminated or non-laminated residential and/or commercial windows, insulating glass units, and/or transparencies for land, air, space, above water and underwater vehicles. In one aspect or embodiment, the coated articles as described herein are transparencies for use in a vehicle, such as a window or a sunroof. Therefore, it is to be understood that the specifically disclosed exemplary aspects or embodiments are presented simply to explain the general concepts of the invention, and that the invention is not limited to these specific exemplary embodiments. Additionally, while a typical "transparency" can have sufficient visible light transmission such that materials can be viewed through the transparency, the "transparency" need not be transparent to visible light but may be translucent or opaque. That is, by "transparent" is meant having visible light transmission of greater than 0% up to 100%.

In some embodiments, the solar control coating 30 can be applied to the surface of a monolithic glazing. By "monolithic" is meant having a single structural support or structural member, e.g., having a single substrate. A non-limiting coated article 10 incorporating features of the invention is illustrated in FIG. 1. The coated article 10 can comprise a substrate 12 having a first surface 14 and a second surface 16 opposite the first surface 12. A solar control coating 30 is applied over the first surface 14 or second surface 16. In one non-limiting embodiment, the solar control coating 30 is applied over the first surface 14. In one non-limiting embodiment, the solar control coating 30 is applied over the second surface 16. The solar control coating 30 includes a first silicon aluminum nitride or silicon nitride layer 32 positioned over and in direct contact with the substrate 12. A nickel-chromium alloy layer 34 is positioned over and in direct contact with at least a portion of the first silicon aluminum nitride or silicon nitride layer 32. A second silicon aluminum nitride or silicon nitride layer 36 is positioned over and in direct contact with at least a portion of the nickel-chromium alloy layer 34. In some embodiments, the solar control coating 30 only includes the first silicon aluminum nitride or silicon nitride layer, the nickel-chromium alloy layer 34, and the second silicon aluminum nitride or silicon nitride layer 36. In other embodiments, the substrate 12 consists of the solar control coating 30 described herein.

Figure 2A:
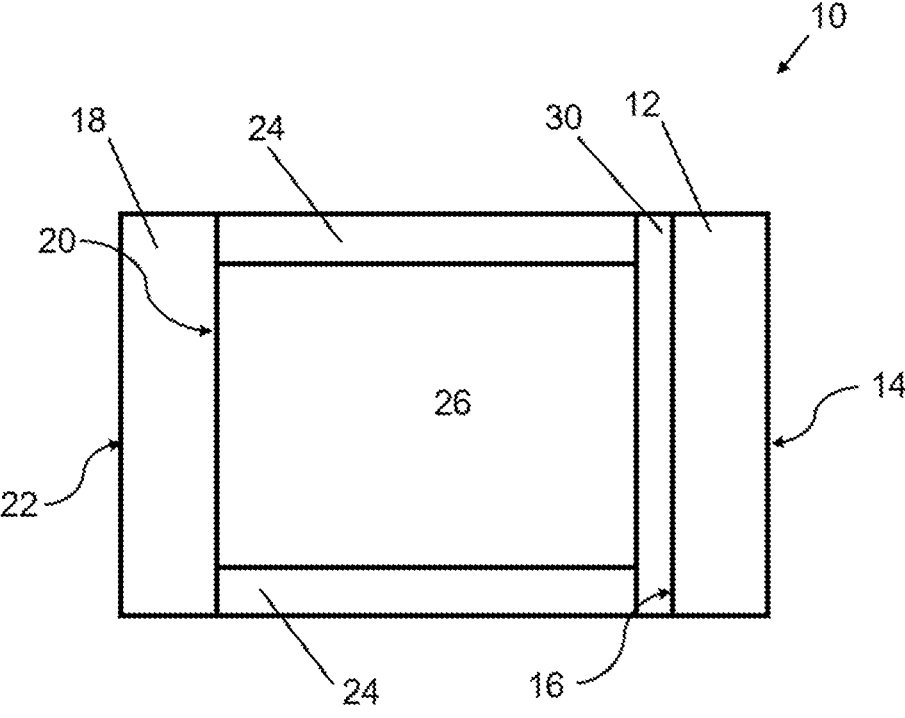
FIG. 2A is a side view (not to scale) of an exemplary non-edge deleted insulating glass unit (IGU) having a solar control coating of the invention.
Figures 2B, 2C:
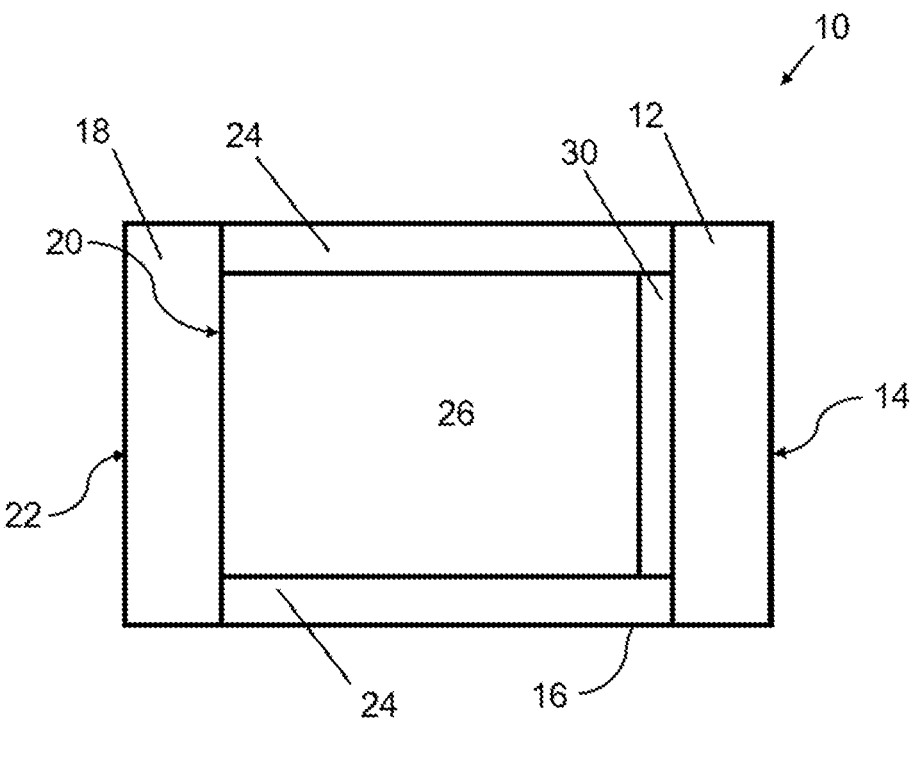
FIG. 2B is a side view (not to scale) of an exemplary edge deleted IGU having a solar control coating of the invention.
FIG. 2C is a sectional view (not to scale) of an exemplary transparency having a solar control coating of the invention.

Exemplary insulating glass units comprising the coated article of the present invention can be found in FIGS. 2A and 2B. As such, the transparency can include a first substrate 12 with a first surface 14 (No. 1 surface) and an opposed second surface 16 (No. 2 surface). In the illustrated non-limiting embodiment, the No. 1 surface 14 faces the building exterior, i.e., is an outer surface, and the No. 2 surface 16 faces the interior of the building. The transparency also includes a second substrate 18 with an inner first surface 20 (No. 3 surface) and an opposed outer second surface 22 (No. 4 surface). The first substrate 12 is separate from the second substrate 18. In some embodiments, the transparency includes a third substrate with a first surface (No. 5 surface) and an opposed second surface (No. 6 surface). In some embodiments, one or more of the substrates may comprise a laminate structure (e.g., a polymeric interlayer sandwiched between two glass substrates). The transparency can have any desired visible light, infrared radiation, or ultraviolet radiation transmission and/or reflection.

In some embodiments, the solar control coating 30 may be non-edge deleted (FIG. 2A) or edge deleted (FIG. 2B). The first and second substrates 12, 18 can be connected in any suitable manner, such as by being adhesively bonded using a polymeric sealant material to a conventional spacer frame 24. A gap or chamber 26 is formed between the two substrates 12, 18. The chamber 26 can be filled with a selected atmosphere, such as, air, or a non-reactive gas such as argon or krypton gas. A solar control coating 30 may be formed over at least a portion of the No. 1 surface 14 of the first substrate 12. The solar control coating may be formed over at least a portion of the No. 2 surface 18 or at least a portion of the No. 3 surface 20 or at least a portion of the No. 4 surface 22 or at least a portion of the number No. 5 surface or at least a portion of the No. 6 surface.

In one non-limiting embodiment, the solar control coating 30 can be formed over at least a portion of the No. 3 surface 20 of a double-glazed IGU. In another non-limiting embodiment, the solar control coating 30 can be formed over at least a portion of the No. 4 surface 22 of a double-glazed IGU. In one non-limiting embodiment, the solar control coating 30 can be formed on the No. 2 surface 18 of a triple-glazed IGU. In another non-limiting embodiment, the solar control coating 30 can be formed on the No. 3 surface 20 of a triple-glazed IGU. In another non-limiting embodiment, the solar control coating 30 can be formed on the No. 4 surface 22 of a triple-glazed IGU. In another non-limiting embodiment, the solar control coating 30 can be formed on the No. 5 surface of a triple-glazed IGU. In another non-limiting embodiment, the solar control coating 30 can be formed on the No. 6 surface of a triple-glazed IGU. Examples of insulating glass units are found, for example, in U.S. Pat. Nos. 4,193,228; 4,464,874; 5,088,258; and 5,106,663.

The exemplary transparency of FIG. 2C is in the form of a conventional transparency for a vehicle, such as a window or sunroof. For clarity, seals, connectors and opening mechanisms are not shown, nor is the complete vehicle. The transparency 110 includes a first substrate 112 with a first surface 114 (No. 1 surface) and an opposed second surface 116 (No. 2 surface) mounted in the body of a vehicle 118 (shown in part). In the illustrated non-limiting embodiment, the first surface 114 faces the vehicle's exterior, and thus is an outer surface, and the second surface 116 faces the interior of the vehicle. Non-limiting examples of a vehicle body include: an automobile roof in the case of a sunroof, an automobile door or frame in the case of an automobile window, or a fuselage of an airplane. The transparency may be affixed to a mechanism by which the transparency, such as, a car window or sunroof, can be opened and closed, as is broadly known in the vehicular arts. A solar control coating 130 described herein, is shown as formed over at least a portion of the first surface 114, or it may be formed over at least a portion of the second surface 116.

In the broad practice of the invention, the substrates 12, 18, 112 of the transparency can be of the same or different materials. The substrates 12, 18, 112 can include any desired material having any desired characteristics. For example, one or more of the substrates 12, 18, 112 can be transparent or translucent to visible light. By "transparent" is meant having visible light transmission of greater than 0% up to 100%. Alternatively, one or more of the plies 12, 18, 112, can be translucent. By "translucent" is meant allowing electromagnetic energy (e.g., visible light) to pass through but diffusing this energy such that objects on the side opposite the viewer are not clearly visible. Examples of suitable materials include, but are not limited to, plastic substrates (such as acrylic polymers, such as polyacrylates; polyalkylmethacrylates, such as, polymethylmethacrylates, polyethylmethacrylates, polypropylmethacrylates, and the like; polyurethanes; polycarbonates; polyalkylterephthalates, such as polyethyleneterephthalate (PET), polypropyleneterephthalates, polybutyleneterephthalates, and the like; polysiloxane-containing polymers; or copolymers of any monomers for preparing these, or any mixtures thereof); ceramic substrates; glass substrates; or mixtures or combinations of any of the above. For example, one or more of the substrates 12, 18, 112 can include conventional soda-lime-silicate glass, borosilicate glass, or leaded glass. The glass can be clear glass. By "clear glass" is meant non-tinted or non-colored glass. Alternatively, the glass can be tinted or otherwise colored glass. The glass can be annealed or heat-treated glass. As used herein, the term "heat treated" means tempered or at least partially tempered. The glass can be of any type, such as conventional float glass, and can be of any composition having any optical properties, e.g., any value of visible transmission, ultraviolet transmission, infrared transmission, and/or total solar energy transmission. By "float glass" is meant glass formed by a conventional float process in which molten glass is deposited onto a molten metal bath and controllably cooled to form a float glass ribbon. Examples of float glass processes are disclosed in U.S. Pat. Nos. 4,466,562 and 4,671,155.

The substrates 12, 18, 112 can each comprise, for example, clear float glass or can be tinted or colored glass or one substrate 12, 18 can be clear glass and the other substrate 12, 18, colored glass. Although not limiting, examples of glass suitable for the first substrates 12, 112 and/or second substrate 18 are described in U.S. Pat. Nos. 4,746,347;

4,792,536; 5,030,593; 5,030,594; 5,240,886; 5,385,872; and 5,393,593. The substrates 12, 18, 112 can be of any desired dimensions, e.g., length, width, shape, or thickness. In one exemplary transparency, the substrates 12, 18, 112 can be 1 mm to 25 mm thick, such as 1 mm to 8 mm thick, such as 2 mm to 8 mm, such as 3 mm to 7 mm, such as 5 mm to 7 mm, such as 6 mm thick. In other examples, thinner substrates can be used in the transparency, for example, substrates having a thickness of less than 1 mm.

In non-limiting embodiments of the coated articles 10 described herein, the solar control coating 30 of the invention is deposited over at least a portion of at least one surface of one of the glass substrates 12, 18, 112. In the example according to FIG. 2A, the solar control coating 30 is formed over at least a portion of the inner surface 16 of the outboard glass substrate 12; additionally or alternatively, it is to be understood that in non-limiting examples consistent with the present disclosure a solar control coating 30 may be formed over at least a portion of the outer surface 14 of the outboard glass substrate 12. In one embodiment, the solar control coating 30 is the only coating applied over the first surface 14, 20, 114 or second surface 16, 22, 116 of the substrate 12, 18, 112.

The solar coatings described herein, such as the solar control coating 30, can be deposited by any useful method, such as, but not limited to, conventional chemical vapor deposition (CVD) and/or physical vapor deposition (PVD) methods. Examples of CVD processes include spray pyrolysis. Examples of PVD processes include electron beam evaporation and vacuum sputtering (such as magnetron sputter vapor deposition (MSVD)). Other coating methods could also be used, such as, but not limited to, sol-gel deposition. In one non-limiting embodiment, the solar control coating 30 is deposited by MSVD. Examples of MSVD coating devices and methods will be well understood by one of ordinary skill in the art and are described, for example, in U.S. Pat. Nos. 4,379,040; 4,861,669; 4,898,789; 4,898,790; 4,900,633; 4,920,006; 4,938,857; 5,328,768; and 5,492,750.

The solar control coating 30 includes a first silicon aluminum nitride or silicon nitride layer 32 positioned over the substrate 12, 18, 112, a nickel-chromium alloy layer 34 positioned over and in direct contact with the first silicon aluminum nitride or silicon nitride layer 32, and a second silicon aluminum nitride or silicon nitride layer 36 positioned over and in direct contact with the nickel-chromium layer 34.

The first silicon aluminum nitride or silicon nitride layer 32 comprises silicon aluminum nitride or silicon nitride. The first silicon nitride layer 32 can be sputtered from a single cathode containing silicon. The first silicon aluminum nitride layer 32 can be sputtered from two cathodes (e.g., one silicon and one aluminum) or from a single cathode containing both silicon and aluminum. The first silicon aluminum nitride layer 32 can comprise from 5 wt. % to 20 wt. % aluminum and 95 wt. % to 80 wt. % silicon, such as 10 wt. % to 20 wt. % aluminum and 90 wt. % to 80 wt. % silicon, such as 20 wt. % to 25 wt. % aluminum and 80 wt. % to 75 wt. % silicon. In one exemplary embodiment, the first silicon aluminum nitride or silicon nitride layer 32 comprises silicon. In another embodiment, the first silicon aluminum nitride layer 32 comprises silicon and aluminum comprising at least 5 wt. % aluminum and at least 95 wt. % silicon. In another embodiment, the first silicon aluminum nitride layer 32 comprises silicon and aluminum comprising at least 10 wt. % aluminum and at least 90 wt. % silicon. In another embodiment, the first silicon aluminum nitride layer 32 comprises silicon and aluminum comprising at least 15 wt. % aluminum and at least 85 wt. % silicon. In another embodiment, the first silicon aluminum nitride layer 32 comprises silicon and aluminum comprising at least 20 wt. % aluminum and at least 80 wt. % silicon. In another embodiment, the first silicon aluminum nitride layer 32 comprises silicon and aluminum comprising at least 25 wt. % aluminum and at least 75 wt. % silicon. In one non-limiting embodiment, silicon and aluminum are substantially the only metals in the first silicon aluminum nitride layer 32. In one non-limiting embodiment, silicon is substantially the only metal in the first silicon nitride layer 32. That is, the first silicon aluminum nitride layer can be substantially free, or completely free, of other metals. As used herein, "substantially free of other metals" means that the first silicon aluminum nitride layer contains less than 1 wt. % of additional metals other than silicon and aluminum. For example the first silicon aluminum nitride or silicon nitride layer 32 is substantially free of titanium, zirconium, hafnium, or mixtures thereof.

The first silicon aluminum nitride or silicon nitride layer 32 is formed by sputtering the metal or metal alloy in a nitrogen ($N_2$) atmosphere that has a specific flow rate as to form an atmosphere of greater than 0% $N_2$ to less than or equal to 100% $N_2$. The flow rate is an approximation to the amount of $N_2$ in the atmosphere, but that one of ordinary skill in the art would recognize that additional $N_2$ may leak into the coating chamber if there are any leaks from the external atmosphere into the coating chamber. For example, the $N_2$ composition (i.e. concentration of $N_2$ in the atmosphere for the chamber where the material is being deposited) in the coating chamber can be in the range of 10% to 100%, such as 20% to 100%, such as 30% to 100%, such as 40% to 100%, such as 50% to 100%. The remainder of the atmosphere can be an inert gas, such as, argon.

The metal or metal alloy can be sputtered in the nitrogen-containing atmosphere such that the deposited first silicon aluminum nitride or silicon nitride layer 32 comprises a stoichiometric film, such as a stoichiometric silicon aluminum nitride film or a stoichiometric silicon nitride film. The atomic ratio of nitrogen in the first silicon aluminum nitride or silicon nitride layer 32 can vary, from at least 45 atomic percent (at. %) to not more than 60 at. %, such as at least 50 at. % to not more than 60 at. %, such as at least 55 at. % to not more than 60 at. %, where at. % refers to the ratio of the moles of nitrogen to the total moles of the film composition. The first silicon aluminum nitride or silicon nitride layer 32 comprises at least 30 wt. % nitrogen and not more than 50 wt. % nitrogen, or at least 35 wt. % nitrogen and not more than 50 wt. % nitrogen, or at least 35 wt. % nitrogen and not more than 45 wt. % nitrogen, or at least 35 wt. % and not more than 40 wt. % nitrogen.

One of ordinary skill in the art would recognize that the first silicon aluminum nitride or silicon nitride layer 32 may further contain unintentional elements. The unintentional elements may be incorporated into the first silicon aluminum nitride or silicon nitride layer 32 such as, through equipment malfunction of the coater or cross contamination of the process chambers. For example, oxygen (02) may leak into the coating chamber if there are any leaks from the external atmosphere into the coating chamber. In one non-limiting embodiment, the first silicon aluminum nitride or silicon nitride layer 32 comprises at least 90 at. % silicon aluminum nitride or silicon nitride and not more than 10 at. % combined oxygen or species other than silicon, aluminum, and nitrogen; such as, at least 95 at. % silicon aluminum nitride or silicon nitride and not more than 5 at. % combined oxygen or species other than silicon, aluminum, and nitrogen; such as, at least 97 at. % silicon aluminum nitride or silicon nitride and not more than 3 at. % combined oxygen or species other than silicon, aluminum, and nitrogen; such as, at least 99 at. % silicon aluminum nitride or silicon nitride and not more than 1 at. % combined oxygen or species other than silicon, aluminum, and nitrogen; or such as, 100 at. % silicon aluminum nitride or silicon nitride and 0 at. % combined oxygen or species other than silicon, aluminum, and nitrogen.

The first silicon aluminum nitride or silicon nitride layer 32 can comprise a total thickness of less than 15 nanometers (nm). The first silicon aluminum nitride layer 32 can comprise a total thickness of 1 nm to 14 nm, preferably 4 nm to 13 nm, more preferably 6 to 12 nm, or most preferably 7 nm to 11 nm.

The nickel-chromium alloy layer 34 comprises a nickel-chromium alloy. The nickel-chromium alloy layer 34 excludes other metal elements (e.g., niobium, tantalum, molybdenum, zirconium, titanium, cobalt, tungsten) and alloys thereof. The nickel-chromium alloy layer 34 comprises 70 wt. % to 90 wt. % nickel and 10 wt. % to 30 wt. % chromium, such as 75 wt. % to 85 wt. % nickel and 15 wt. % to 25 wt. % chromium, such as 80 wt. % nickel and 20 wt. % chromium. In one non-limiting embodiment, the nickel-chromium alloy is INCONEL.

The nickel-chromium alloy layer is substantially free of nitrogen and/or oxygen. However, one of ordinary skill in the art would recognize that the nickel-chromium alloy layer 34 may further contain unintentional elements, such as, nitrogen and oxygen. As used herein, "substantially free of nitrogen and/or oxygen" means that the nickel-chromium alloy layer contains less than 2 wt. % of nitrogen and/or oxygen. The unintentional elements may be incorporated into the nickel-chromium alloy layer 34 such as, through equipment malfunction of the coater or cross contamination of the process chambers. These unintentional elements can be either in the gas phase or can be adsorbed on the interior surfaces of the vacuum chamber, which can become desorbed from those surfaces and incorporated into the nickel-chromium alloy layer 34 while the layer is being deposited. Nitrogen can be incorporated into the nickel-chromium alloy layer film due to neighboring process chambers which were used to deposit the silicon aluminum nitride layers. The nickel-chromium alloy layer 34 can comprise at least 90 at. % nickel-chromium alloy and not more than 10 at. % oxygen, nitrogen, or species other than nickel and chromium; such as, at least 95 at. % nickel-chromium alloy and not more than 5 at. % combined oxygen, nitrogen, or species other than nickel and chromium; such as, at least 97 at. % nickel-chromium alloy and not more than 3 at. % combined oxygen, nitrogen, or species other than nickel and chromium, such as, at least 99 at. % nickel-chromium alloy and not more than 1 at. % combined oxygen, nitrogen, or species other than nickel and chromium; or such as, 100 at. % nickel-chromium alloy and 0 at. % combined oxygen, nitrogen or species other than nickel and chromium.

The nickel-chromium alloy layer 34 comprises a thickness of 1 nm to 10 nm, preferably, 1 nm to 9.5 nm, more preferably, 1.5 nm to 9 nm, or most preferably 2 nm to 8.5 nm.

The second silicon aluminum nitride or silicon nitride layer 36 comprises silicon aluminum nitride or silicon nitride. The second silicon aluminum nitride or silicon nitride layer 36 can comprise the silicon aluminum nitride or silicon nitride described above with respect to the first silicon aluminum nitride or silicon nitride layer 32. In one non-limiting embodiment, silicon and aluminum are substantially the only metals in the second silicon aluminum nitride layer 36, as previously described. In another non-limiting embodiment, silicon is substantially the only metal in the second silicon nitride layer 36, as previously described.

The second silicon aluminum nitride or silicon nitride layer 36 is formed by sputtering the metal or metal alloy in a $N_2$ atmosphere that has a specific flow rate as to form an atmosphere of greater than 0% $N_2$ to less than or equal to 100% $N_2$. The flow rate is an approximation to the amount of $N_2$ in the atmosphere, but, that one of ordinary skill in the art would recognize that additional $N_2$ may leak into the coating chamber if there are any leaks from the external atmosphere into the coating chamber. For example, the $N_2$ composition (i.e. concentration of $N_2$ in the atmosphere for the chamber where the material is being deposited) in the chamber can be in the range of 10% to 100%, such as 20% to 100%, such as 30% to 100%, such as 40% to 100%, such as 50% to 100%. The remainder of the atmosphere can be an inert gas, such as, argon.

The metal or metal alloy can be sputtered in the nitrogen-containing atmosphere such that the deposited second silicon aluminum nitride or silicon nitride layer 36 comprises a stoichiometric film, such as, a stoichiometric silicon aluminum nitride film or a stoichiometric silicon nitride film. The atomic ratio of nitrogen in the second silicon aluminum nitride or silicon nitride layer 36 can vary from at least 45 at. % to not more than 60 at. %, such as at least 50 at. % to not more than 60 at. %, such as at least 55 at. % to not more than 60 at. %. The second silicon aluminum nitride or silicon nitride layer 36 comprises at least 30 wt. % nitrogen and not more than 50 wt. % nitrogen, or at least 35 wt. % nitrogen and not more than 50 wt. % nitrogen, or at least 35 wt. % nitrogen and not more than 45 wt. % nitrogen, or at least 35 wt. % and not more than 40 wt. % nitrogen.

One of ordinary skill in the art would recognize that the second silicon aluminum nitride or silicon nitride layer 36 may further contain unintentional elements. The unintentional elements may be incorporated into the second silicon aluminum nitride or silicon nitride layer 36 such as, through equipment malfunction of the coater or cross contamination of the process chambers. For example, 02 may leak into the coating chamber if there are any leaks from the external atmosphere into the coating chamber. In one non-limiting embodiment, the first silicon aluminum nitride or silicon nitride layer 32 comprises at least 90 at. % silicon aluminum nitride or silicon nitride and not more than 10 at. % combined oxygen or species other than silicon, aluminum, and nitrogen; such as, at least 95 at. % silicon aluminum nitride or silicon nitride and not more than 5 at. % combined oxygen or species other than silicon, aluminum, and nitrogen; such as, at least 97 at. % silicon aluminum nitride or silicon nitride and not more than 3 at. % combined oxygen or species other than silicon, aluminum, and nitrogen; such as, at least 99 at. % silicon aluminum nitride or silicon nitride and not more than 1 at. % combined oxygen or species other than silicon, aluminum, and nitrogen; or such as, 100 at. % silicon aluminum nitride or silicon nitride and 0 at. % combined oxygen or species other than silicon, aluminum, and nitrogen.

The second silicon aluminum nitride or silicon nitride layer 36 comprises a thickness of less than 60 nm, such as from 25 nm to 58 nm, preferably 30 nm to 55 nm, more preferably 32 nm to 50 nm, or most preferably 35 nm to 48 nm.

In some non-limiting embodiments, the ratio of the thickness of the first silicon aluminum nitride or silicon nitride layer 32 to the thickness of the nickel-chromium alloy layer 24 to the thickness of the second silicon aluminum nitride or silicon nitride layer 36 is 1-5:1:3-22. In other embodiments, the ratio of the thickness of the first silicon aluminum nitride or silicon nitride layer 32 to the thickness of the nickel-chromium alloy layer 34 to the thickness of the second silicon aluminum nitride layer 36 is 1-4:1:4-20.

In some non-limiting embodiments, the thickness of the second silicon aluminum nitride or silicon nitride layer 36 is greater than the thickness of the first silicon aluminum nitride or silicon nitride layer 32. For example, the ratio of the thickness of the first silicon aluminum nitride or silicon nitride layer 32 to the thickness of the second silicon aluminum nitride or silicon nitride layer 36 is at least 1:2, such as at least 1:3, or such as at least 1:4.

In some non-limiting embodiments, the thickness of the second silicon aluminum nitride or silicon nitride layer 36 is greater than the total thickness of the first silicon aluminum nitride or silicon nitride layer 32 and the nickel-chromium alloy layer 34. For example, in some non-limiting embodiments, the ratio of the total thickness of the first silicon aluminum nitride or silicon nitride layer 32 and the thickness of the nickel-chromium alloy layer 34 is at least 1:2. In some embodiments, the total thickness of the first silicon aluminum nitride or silicon nitride layer 32 and the nickel-chromium alloy layer 34 is less than 25 nm, such as from 2 nm to 24 nm, preferably 5 nm to 22 nm, more preferably, 7.5 nm to 21 nm, or most preferably, 9 nm to 19.5 nm.

One of ordinary skill in the art could envision that additional coatings could be used, such as a primer coating and/or a protective coating. For example, a primer coating may be positioned over and in direct contact with the nickel-chromium alloy layer 34 of the solar control coating 30. The primer coating can be a single film or a multiple film layer. The primer coating can include an oxygen-capturing material that can be sacrificial during the deposition process to prevent degradation or oxidation of the nickel-chromium alloy layer during the sputtering process or subsequent heating processes. The primer coating can also absorb at least a portion of electromagnetic radiation, such as visible light, passing through the coating. Non-limiting examples of materials suitable for the primer coating include titanium, silicon, nickel, chromium, cobalt, niobium, vanadium, molybdenum, tantalum, tungsten, hafnium, indium, tin, zirconium, aluminum, alloys of silicon and aluminum, and/or mixtures thereof. For example, the primer coating can be zinc aluminum, such as aluminum-doped zinc. For example, the primer coating can be titanium and can have a total thickness in the range of 0.1 nm to 6 nm, preferably 0.5 nm to 5 nm, more preferably 0.7 nm to 4 nm, most preferably 1 nm to 3.5 nm.

Additional layers can be applied over top of the solar control coating 30. For example, additional layers can be applied over the second silicon aluminum nitride or silicon nitride layer 36 of the solar control coating 30, to provide the coated article with additional properties.

For example, the solar control coating 30 as described previously herein could include a protective coating over the second silicon aluminum nitride or silicon nitride layer 36 of the solar control coating 30. The protective coating can help protect the underlying coatings from mechanical and chemical attack. The protective coating may comprise more than one protective film, and can include, for example, a metal oxide and/or metal nitride layer. For example, protective coating can include silica, alumina, a mixture of silica and alumina, silicon nitride, silicon aluminum oxynitride, titania, titanium aluminum oxide, zirconia, or mixture thereof. The protective coating may have a total thickness of greater than 0 nm.

However, it can be appreciated that the coated article may be free of one or more primer coatings and/or a protective coating. In one embodiment, the surface of the substrate may only include the solar control coating (i.e. no primer coating or protective coating). In such instances, the first silicon aluminum nitride layer 32, the nickel-chromium alloy layer 34, and the second silicon aluminum nitride layer 36 are the only layers of the solar control coating 30.

The reflected and transmitted aesthetics of the solar control coating 30 depend upon the physical phenomenon of optical interference of light, and, in general, are a sensitive function of the optical properties of the materials employed in the solar control coating 30, the thicknesses of the materials employed in the solar control coating 30, and the sequence of such materials in the solar control coating 30. In the practice of the invention, it is desirable that the aesthetics and solar-control performance of the substrates coated with the solar control coating 30 exhibit minimal change when the coated substrate is subjected to heat-treatment (e.g., a thermal tempering process). The solar control coating 30 can provide other desirable properties to the coated article, such as, wear resistance and chemical resistance.

In the practice of the invention, by selecting a particular thickness for the first silicon aluminum nitride or silicon nitride layer 32, the nickel-chromium alloy layer 34, and the second silicon aluminum nitride or silicon nitride layer 36, the absorbed color (e.g., tint) of the coating can be varied. In the practice of the invention, it is desired to maintain the color of the coated article before and after tempering.

The coated article 10 may have a solar heat gain coefficient (SHGC) of less than 0.80, such as less than 0.75, such as less than 0.70. For example, the coated article may have an SHGC in the range of from 0.40 to 0.75, such as from 0.50 to 0.70.

As used herein, the "U-factor" is the thermal transmittance or rate of transfer of heat through a structure divided by the difference in temperature across said structure. The units for U-Factor include BTU per hour-square feet-degrees Fahrenheit ($BTU/h\text{-}ft^2/^\circ$ F.) or Watts per square meters-Kelvin ($W/m^2\text{-}K$). The coated article 10 may have a winter U-factor of less than 1.1 $BTU/h\text{-}ft^{2\cdot\circ}$ F., such as less than 1.05 $BTU/h\text{-}ft^{2\cdot\circ}$ F., such as less than 1.02 $BTU/h\text{-}ft^{2\cdot\circ}$ F. The coated article may have a summer U-factor of less than 1.0 $BTU/h\text{-}ft^{2\cdot\circ}$ F., such as less than 0.95 $BTU/h\text{-}ft^{2\cdot\circ}$ F., such as less than 0.92 $BTU/h\text{-}ft^{2\cdot\circ}$ F. The coated article 10 may have a light-to-solar gain (LSG) of at least 0.80, such as at least 0.85, such as at least 0.88.

The coated article 10 may have a visible transmittance in the range of from 1% to 100%, such as from 30% to 80%, such as from 35% to 75%, such as in the range of from 45% to 70%.

As used herein, "exterior reflectance" is the measure of reflectance of the coated article from the uncoated surface (i.e., the substrate side). The coated article may have an exterior reflectance in the range of from 1% to 50%, such as from 5% to 30%, such as from 12% to 20%.

As used herein, "interior reflectance" is the measure of reflectance of the coated article from the coated surface (i.e., the coating side). The coated article may have an interior reflectance in the range of from 1% to 50%, such as from 5% to 25%, such as from 8% to 16%. In some non-limiting embodiments, the internal light reflection is less than 16%.

The coated article may have transmitted aesthetic CIELAB L*a*b* color value of L* in the range of from 60 to 95, such as from 68 to 90, such as from 72 to 86; a* in the range of from −3 to 0, such as from −2.5 to −0.5, such as from −2.4 to −1; and a b* in the range of from −4 to 1.1, such as from −3.5 to 1, such as from −3.1 to 0.9.

The coated article may have an exterior reflective aesthetic CIELAB L*a*b* color value (measured from uncoated glass side) of L* in the range of from 35 to 60, such as from 40 to 55, such as from 44 to 50; a* in the range of from −4 to −2, such as from −3.8 to −2.3, such as from −3.3 to −2.5; and a b* in the range of from −10 to −5, such as from −9.5 to −6, such as from −9 to −6.5.

The coated article may have an interior reflective aesthetic CIELAB L*a*b* color value (measured from coated side) of L* in the range of from 25 to 55, such as from 30 to 50, such as from 34 to 47; an a* in the range of from −2 to 4, such as from −1.5 to 3.5, such as from −1 to 3; and a b* in the range of from −4 to 13, such as from −3 to 12.5, such as from −2.5 to 11.5. In one non-limiting embodiment, the interior reflective L* value is not greater than 46.

Visible light transmittance, visible light exterior reflectance, visible light interior reflectance, solar transmittance, solar exterior reflectance, solar interior reflectance, and UV transmittance were determined using a Perkin Elmer 1050 Spectrophotometer. Reference values, including Shading Coefficient (SC), Solar Heat Gain Coefficient (SHGC), Light-to-Solar Gain (LSG), unless indicated to the contrary, are those determined in accordance with OPTICS (v6.0) software and WINDOW (v7.6.4) software available from Lawrence Berkeley National Laboratory, measured center of glazing (COG), calculated according to NFRC 2010 (which includes NFRC 100-2010) standard default settings. U-factors, unless indicated to the contrary, are winter/night U-factors. SHGC values, unless indicated to the contrary, are summer/day values. Color values (e.g., L*, a*, b*) are in accordance with the 1976 CIELAB color system specified by the International Commission on Illumination. The L*, a*, b* values in the specification represent color center point values.

The invention is further described in the following numbered clauses.

Clause 1: A coated article comprising: a substrate comprising a first surface and a second surface opposite the first surface; and a solar control coating applied over the first surface or second surface of the substrate, the solar control coating comprising: a first silicon aluminum nitride or silicon nitride layer over at least a portion of the substrate; a nickel-chromium alloy layer over and in direct contact with at least a portion of the silicon aluminum nitride or silicon nitride layer; and a second silicon aluminum nitride or silicon nitride layer over and in direct contact with at least a portion of the nickel-chromium alloy layer.

Clause 2: The coated article of clause 1, wherein the solar control coating consists of the first silicon aluminum nitride or silicon nitride layer, the nickel-chromium alloy layer, and the second silicon aluminum nitride or silicon nitride layer.

Clause 3: The coated article of clause 1, wherein the solar control coating is the only coating applied over the first surface or second surface of the substrate.

Clause 4: The coated article of clause 1 or 2, wherein the nickel-chromium alloy layer comprises an alloy of 70 weight percent to 90 weight percent nickel and 10 weight percent to 30 weight percent chromium.

Clause 5: The coated article of clauses 1 or 2, wherein the thickness of the first silicon aluminum nitride or silicon nitride layer comprises a thickness of less than 15 nanometers.

Clause 6: The coated article of clauses 1 or 2, wherein the nickel-chromium alloy layer comprises a thickness in the range of 1 nanometer to 10 nanometers.

Clause 7: The coated article of clauses 5 to 6, wherein the total thickness of the first silicon aluminum nitride or silicon nitride layer and the nickel-chromium alloy layer is less than 25 nanometers.

Clause 8: The coated article of clause 1 or 2, wherein the thickness of the second silicon aluminum nitride or silicon nitride layer comprises a thickness of less than 60 nanometers.

Clause 9: The coated article of any of clauses 1 to 8, wherein the ratio of the thickness of the first silicon aluminum nitride or silicon nitride layer to the thickness of the nickel-chromium alloy layer to the thickness of the second silicon aluminum nitride or silicon nitride layer is 1-5:1:3-22.

Clause 10: The coated article of clause 9, wherein the ratio of the thickness of the first silicon aluminum nitride or silicon nitride layer to the thickness of the nickel-chromium alloy layer to the thickness of the second silicon aluminum nitride or silicon nitride layer is 1-4:1:4-20.

Clause 11: The coated article of any of clauses 1 to 8, wherein the ratio of the total thickness of the first silicon aluminum nitride or silicon nitride layer and the nickel-chromium alloy layer to the thickness of the second silicon aluminum nitride or silicon nitride layer is at least 1:2.

Clause 12: The coated article of any of clauses 1 to 8, wherein the ratio of the thickness of the first silicon aluminum nitride or silicon nitride layer to the thickness of the second silicon aluminum nitride or silicon nitride layer is least 1:3.

Clause 13: The coated article of clause 12, wherein the ratio of the thickness of the first silicon aluminum nitride or silicon nitride layer to the thickness of the second silicon aluminum nitride or silicon nitride layer is at least 1:4.

Clause 14: The coated article of any of clauses 1 to 13, wherein the reflected interior L* value is not greater than 46.

Clause 15: The coated article of any of clauses 1 to 14, wherein the internal light reflection is less than 16 percent.

Clause 16: The coated article of any of clauses 1 to 15, wherein the substrate comprises glass.

Clause 17: The coated article of any of clauses 1 to 16, wherein the article is temperable.

Clause 18: A coated article consisting of: a glass substrate; and a solar control coating applied over the glass substrate, the solar control coating comprising: a first silicon aluminum nitride or silicon nitride layer over at least a portion of the substrate; a nickel-chromium alloy layer over and in direct contact with at least a portion of the silicon aluminum nitride or silicon nitride layer; and a second silicon aluminum nitride or silicon nitride layer over and in direct contact with at least a portion of the nickel-chromium alloy layer.

Clause 19: The coated article of clause 18, wherein the solar control coating consists of the first silicon aluminum nitride or silicon nitride layer, the nickel-chromium alloy layer, and the second silicon aluminum nitride or silicon nitride layer.

Clause 20: The coated article of clause 18 or 19, wherein the nickel-chromium alloy layer comprises an alloy of 70 weight percent to 90 weight percent nickel and 10 weight percent to 30 weight percent chromium.

Clause 21: The coated article of clause 18 or 19, wherein the thickness of the first silicon aluminum nitride or silicon nitride layer comprises a thickness of less than 15 nanometers.

Clause 22: The coated article of clause 18 or 19, wherein the nickel-chromium alloy layer comprises a thickness in the range of 1 nanometer to 10 nanometers.

Clause 23: The coated article of clauses 21 to 22, wherein the total thickness of the first silicon aluminum nitride or silicon nitride layer and the nickel-chromium alloy layer is less than 25 nanometers.

Clause 24: The coated article of clause 18 or 19, wherein the thickness of the second silicon aluminum nitride or silicon nitride layer comprises a thickness of less than 60 nanometers.

Clause 25: The coated article of any of clauses 18 to 24, wherein the ratio of the thickness of the first silicon aluminum nitride or silicon nitride layer to the thickness of the nickel-chromium alloy layer to the thickness of the second silicon aluminum nitride or silicon nitride layer is 1-5:1:3-22.

Clause 26: The coated article of clause 25, wherein the ratio of the thickness of the first silicon aluminum nitride layer to the thickness of the nickel-chromium alloy layer to the thickness of the second silicon aluminum nitride layer is 1-4:1:4-20.

Clause 27: The coated article of any of clauses 18 to 24, wherein the ratio of the total thickness of the first silicon aluminum nitride layer and the nickel-chromium alloy layer to the thickness of the second silicon aluminum nitride or silicon nitride layer is at least 1:2.

Clause 28: The coated article of any of clauses 18 to 24, wherein the ratio of the thickness of the first silicon aluminum nitride or silicon nitride layer to the thickness of the second silicon aluminum nitride or silicon nitride layer is least 1:3.

Clause 29: The coated article of clause 28, wherein the ratio of the thickness of the first silicon aluminum nitride or silicon nitride layer to the thickness of the second silicon aluminum nitride or silicon nitride layer is at least 1:4.

Clause 30: The coated article of any of clauses 18 to 29, wherein the reflected interior L* value is not greater than 46.

Clause 31: The coated article of any of clauses 18 to 30, wherein the internal light reflection is less than 16 percent.

Clause 32: The coated article of any of clauses 18 to 31, wherein the article is temperable.

Clause 33: The method of making a coated article, the method comprising: providing a substrate comprising a first surface and a second surface opposite the first surface; and forming a solar control coating applied over the first surface or second surface of the substrate, the solar control coating comprising: a first silicon aluminum nitride or silicon nitride layer over at least a portion of the substrate; a nickel-chromium alloy layer over and in direct contact with at least a portion of the silicon aluminum nitride or silicon nitride layer; a second silicon aluminum nitride or silicon nitride layer over and in direct contact with at least a portion of the nickel-chromium alloy layer, wherein the thickness of the first silicon aluminum nitride layer comprises a thickness of less than 15 nanometers, wherein the thickness of the second silicon aluminum nitride or silicon nitride layer comprises a thickness of less than 60 nanometers, and wherein the thickness of the first silicon aluminum nitride or silicon nitride layer to the thickness of the second silicon aluminum nitride or silicon nitride layer is at least 1:3.

Clause 34: The method of clause 33, wherein the solar control coating consists of the first silicon aluminum nitride or silicon nitride layer, the nickel-chromium alloy layer, and the second silicon aluminum nitride or silicon nitride layer.

Clause 35: The method of clause 33 or 34, wherein the solar control coating is the only coating applied over the first surface or second surface of the substrate.

Clause 36: The method of any of clause 33 or 34, wherein the nickel-chromium alloy layer comprises an alloy of 70 weight percent to 90 weight percent nickel and 10 weight percent to 30 weight percent chromium.

Clause 37: The method of clause 33 or 34, wherein the nickel-chromium alloy layer comprises a thickness in the range of 1 nanometer to 10 nanometers.

Clause 38: The method of any of clauses 33 to 37, wherein the ratio of the thickness of the first silicon aluminum nitride or silicon nitride layer to the thickness of the nickel-chromium alloy layer to the thickness of the second silicon aluminum nitride or silicon nitride layer is 1-5:1:3-22.

Clause 39: The method of clause 38, wherein the ratio of the thickness of the first silicon aluminum nitride or silicon nitride layer to the thickness of the nickel-chromium alloy layer to the thickness of the second silicon aluminum nitride or silicon nitride layer is 1-4:1:4-20.

Clause 40: The method of clauses 33 to 37, wherein the ratio of the total thickness of the first silicon aluminum nitride or silicon nitride layer and the nickel-chromium alloy layer to the thickness of the second silicon aluminum nitride or silicon nitride layer is at least 1:2.

Clause 41: The method of clause 33, wherein the ratio of the thickness of the first silicon aluminum nitride or silicon nitride layer to the thickness of the second silicon aluminum nitride or silicon nitride layer is at least 1:4.

Clause 42: The method of any of clauses 33 to 41, wherein the reflected interior L* value is not greater than 46.

Clause 43: The method of any of clauses 33 to 42, wherein the internal light reflection is less than 16 percent.

Clause 44: The method of any of clauses 33 to 43, wherein the substrate comprises glass.

Clause 45: The method of any of clauses 33 to 44, wherein the article is temperable.

Clause 46: A coated article comprising: a substrate comprising a first surface and a second surface opposite the first surface; and a solar control coating applied over the first surface or second surface of the substrate, the solar control coating consisting of: a first silicon aluminum nitride or silicon nitride layer over at least a portion of the substrate; a nickel-chromium alloy layer over and in direct contact with at least a portion of the silicon aluminum nitride or silicon nitride layer; and a second silicon aluminum nitride or silicon nitride layer over and in direct contact with at least a portion of the nickel-chromium alloy layer.

Clause 47: The coated article of clause 46, wherein the solar control coating is the only coating applied over the first surface or second surface of the substrate.

Clause 48: The coated article of clause 46, wherein the nickel-chromium alloy layer comprises an alloy of 70 weight percent to 90 weight percent nickel and 10 weight percent to 30 weight percent chromium.

Clause 49: The coated article of clause 46, wherein the thickness of the first silicon aluminum nitride or silicon nitride layer comprises a thickness of less than 15 nanometers.

Clause 50: The coated article of clause 46, wherein the nickel-chromium alloy layer comprises a thickness in the range of 1 nanometer to 10 nanometers.

Clause 51: The coated article of clauses 49 to 50, wherein the total thickness of the first silicon aluminum nitride or silicon nitride layer and the nickel-chromium alloy layer is less than 25 nanometers.

Clause 52: The coated article of clause 46, wherein the thickness of the second silicon aluminum nitride or silicon nitride layer comprises a thickness of less than 60 nanometers.

Clause 53: The coated article of any of clauses 46 to 52, wherein the ratio of the thickness of the first silicon aluminum nitride or silicon nitride layer to the thickness of the nickel-chromium alloy layer to the thickness of the second silicon aluminum nitride or silicon nitride layer is 1-5:1:3-22.

Clause 54: The coated article of clause 53, wherein the ratio of the thickness of the first silicon aluminum nitride or silicon nitride layer to the thickness of the nickel-chromium alloy layer to the thickness of the second silicon aluminum nitride or silicon nitride layer is 1-4:1:4-20.

Clause 55: The coated article of clauses 46 to 52, wherein the ratio of the total thickness of the first silicon aluminum nitride or silicon nitride layer and the nickel-chromium alloy layer to the thickness of the second silicon aluminum nitride or silicon nitride layer is at least 1:2.

Clause 56: The coated article of any of clauses 46 to 52, wherein the ratio of the thickness of the first silicon aluminum nitride or silicon nitride layer to the thickness of the second silicon aluminum nitride or silicon nitride layer is least 1:3.

Clause 57: The coated article of clause 56, wherein the ratio of the thickness of the first silicon aluminum nitride or silicon nitride layer to the thickness of the second silicon aluminum nitride or silicon nitride layer is at least 1:4.

Clause 58: The coated article of any of clauses 46 to 57, wherein the reflected interior L* value is not greater than 46.

Clause 59: The coated article of any of clauses 46 to 58, wherein the internal light reflection is less than 16 percent.

Clause 60: The coated article of any of clauses 46 to 59, wherein the substrate comprises glass.

Clause 61: The coated article of any of clauses 46 to 60, wherein the article is temperable.

Clause 62: The method of making a coated article, the method comprising: providing a substrate comprising a first surface and a second surface opposite the first surface; and forming a solar control coating applied over the first surface or second surface of the substrate, the solar control coating consisting of: a first silicon aluminum nitride or silicon nitride layer over at least a portion of the substrate; a nickel-chromium alloy layer over and in direct contact with at least a portion of the silicon aluminum nitride or silicon nitride layer; a second silicon aluminum nitride or silicon nitride layer over and in direct contact with at least a portion of the nickel-chromium alloy layer, wherein the thickness of the first silicon aluminum nitride or silicon nitride layer comprises a thickness of less than 15 nanometers, wherein the thickness of the second silicon aluminum nitride or silicon nitride layer comprises a thickness of less than 60 nanometers, and wherein the thickness of the first silicon as-deposited (Comparative Example 1A and Comparative Example 2A) and heat-treated (Comparative Example 1B and Comparative Example 2B).

Coated Article Performance

The resulting performance properties, including the transmittance (T), Exterior Reflectance, Interior Reflectance, U-Factor (for winter and summer conditions), SHGC, and LSG, of Examples 1A, 1B, 2A, 2B, CE-1A, CE-1B, CE-2A, and CE-2B can be found in Table 2.

TABLE 2

| Sample | Transmittance | | | | Interior Reflectance (Rf) | | | | Exterior Reflectance (Rg) | | | |
|---|---|---|---|---|---|---|---|---|---|---|---|---|
| No. | Y | L* | a* | b* | Y | L* | a* | b* | Y | L* | a* | b* |
| 1A | 51.3 | 76.85 | −2.32 | −2.70 | 9.62 | 37.16 | 2.17 | 6.49 | 16.12 | 47.13 | −2.82 | −8.82 |
| CE-1A | 49.2 | 75.54 | −1.72 | 0.27 | 17.66 | 49.08 | −0.11 | 0.61 | 17.45 | 48.83 | −2.55 | −8.53 |
| 1B | 50.25 | 76.22 | −2.25 | −2.80 | 10.75 | 39.15 | 1.91 | 7.64 | 15.97 | 46.93 | −2.65 | −8.10 |
| CE-1B | 50.57 | 76.42 | −2.24 | −0.51 | 16.43 | 47.53 | 0.60 | 0.24 | 15.92 | 46.87 | −2.03 | −9.02 |
| 2A | 64.8 | 84.37 | −1.50 | 0.82 | 15.07 | 45.73 | −0.87 | −1.57 | 16.57 | 47.71 | −2.98 | −7.30 |
| CE-2A | 63.8 | 83.85 | −1.02 | 3.20 | 20.05 | 51.90 | −1.62 | −4.09 | 18.94 | 50.62 | −3.03 | −7.13 |
| 2B | 66.04 | 85.01 | −1.77 | 0.30 | 13.89 | 44.07 | −0.58 | −2.02 | 15.25 | 45.98 | −2.77 | −7.43 |
| CE-2B | 65.44 | 84.71 | −1.15 | 3.11 | 19.21 | 50.94 | −1.52 | −4.10 | 18.04 | 49.55 | −2.90 | −7.17 | aluminum nitride or silicon nitride layer to the thickness of the second silicon aluminum nitride or silicon nitride layer is at least 1:3.

The following Examples illustrate various embodiments of the invention. However, it is to be understood that the invention is not limited to these specific embodiments.

EXAMPLES

Example A

Coated Article Preparation

Glass substrates were coated with solar control coatings according to Table 1. The solar control coatings included a first silicon aluminum nitride (STAIN) layer disposed over the glass substrate, a nickel-chromium alloy layer disposed over the first silicon aluminum nitride layer, and a second silicon aluminum nitride layer disposed over the nickel-chromium alloy layer. Comparative Examples 1 and 2 (CE-1 and CE-2) are commercially available samples comprising a glass substrate coated with a solar control coating having the following structure:

a first SiAlN layer
a niobium nitride layer
a second SiAlN layer.

TABLE 1

| Example No. | Structure | Thickness (nanometers) |
|---|---|---|
| 1 | Substrate | |
| | First SiAlN layer | 7.9 |
| | Nickel-Chromium Alloy Layer | 7.8 |
| | Second SiAlN Layer | 36.8 |
| 2 | Substrate | |
| | First SiAlN layer | 10.6 |
| | Nickel-Chromium Alloy Layer | 2.8 |
| | Second SiAlN Layer | 40.5 |

Examples 1 and 2 were tested as-deposited (Example 1A and Example 2A) and heat-treated (Example 1B and Example 2B). Comparative Examples 1 and 2 were tested

Example B

Coated Article Preparation

Glass substrates were coated with solar control coatings according to Table 3. The solar control coatings included a first silicon aluminum nitride (SiAlN) layer disposed over the glass substrate, a nickel-chromium alloy layer disposed over the first silicon aluminum nitride layer, and a second silicon aluminum nitride layer disposed over the nickel-chromium alloy layer. Comparative Examples 3 and 4 (CE-3 and CE-4) are commercially available samples comprising a glass substrate coated with a solar control coating having the following structure:

a first SiAlN layer
a niobium nitride layer
a second SiAlN layer.

TABLE 3

| Example No. | Structure | Thickness (nanometers) |
|---|---|---|
| 3 | Substrate | |
| | First SiAlN layer | 8.4 |
| | Nickel-Chromium Alloy Layer | 6.4 |
| | Second SiAlN Layer | 39.7 |
| 4 | Substrate | |
| | First SiAlN layer | 9.2 |
| | Nickel-Chromium Alloy Layer | 2.4 |
| | Second SiAlN Layer | 46.5 |

Examples 3 and 4 were tested as-deposited (Example 3A and Example 4A) and heat-treated (Example 3B and Example 4B). Comparative Examples 3 and 4 were tested as-deposited (Comparative Example 3A and Comparative Example 4A) and heat-treated (Comparative Example 3B and Comparative Example 4B).

Coated Article Performance

The resulting performance properties, including the transmittance (T), Exterior Reflectance, Interior Reflectance, U-Factor for winter and summer conditions, SHGC, and LSG, of Examples 3A, 3B, 4A, 4B, CE-3A, CE-3B, CE-4A, and CE-4B can be found in Table 4. Two samples (n=2) were tested for each Example 3A, 3B, 4A, and 4B. One sample (n=1) was tested for each CE-3A, CE-3B, CE-4A, and CE-4B.

TABLE 4

| Sample No. | Visible | | | U-Factor | | | | SHGC | LSG |
| | T (%) | Exterior Reflectance (%) | Interior Reflectance (%) | Winter | | Summer | | | |
| | | | | Btu/h-ft²-° F. | W/m²-K | Btu/h-ft²-F. | W/m²-K | | |
|---|---|---|---|---|---|---|---|---|---|
| 3A | 49.9 | 16.8 | 9.1 | 0.957 | 5.432 | 0.853 | 4.843 | 0.545 | 0.92 |
| CE-3A | 50.0 | 17.4 | 17.7 | 1.010 | 5.733 | 0.909 | 5.163 | 0.576 | 0.87 |
| 3B | 47.8 | 17.1 | 10.2 | 0.939 | 5.329 | 0.833 | 4.732 | 0.536 | 0.89 |
| CE-3B | 50.8 | 15.9 | 16.5 | 1.012 | 5.747 | 0.912 | 5.178 | 0.577 | 0.88 |
| 4A | 66.0 | 18.0 | 14.1 | 1.016 | 5.767 | 0.915 | 5.197 | 0.676 | 0.98 |
| CE-4A | 65.0 | 18.9 | 20.0 | 1.023 | 5.811 | 0.923 | 5.243 | 0.685 | 0.95 |
| 4B | 65.8 | 16.7 | 12.9 | 1.014 | 5.756 | 0.913 | 5.186 | 0.674 | 0.98 |
| CE- 4B | 66.0 | 18.0 | 19.2 | 1.024 | 5.814 | 0.924 | 5.246 | 0.691 | 0.95 |

The performance of Examples 3A, 3B, 4A, and 4B have comparable performance to CE-3A, CE-3B, CE-4A, and CE-4B.

Coated Article Aesthetics

The resulting aesthetic properties, including the transmitted color, reflected exterior color, and reflected interior color of Examples 3A, 3B, 4A, 4B, CE-3A, CE-3B, CE-4A, and CE-4B can be found in Table 5. Two samples (n=2) were tested for each Example 3A, 3B, 4A, and 4B. One sample (n=1) was tested for each CE-3A, CE-3B, CE-4A, and CE-4B.

TABLE 5

| Sample No. | Color | | | | | | | | |
| | Transmitted | | | Reflected Exterior | | | Reflected Interior | | |
| | L* | a* | b* | L* | a* | b* | L* | a* | b* |
|---|---|---|---|---|---|---|---|---|---|
| 3A | 76.14 | −2.22 | −2.85 | 48.30 | −2.75 | −8.72 | 35.82 | 2.79 | 9.31 |
| CE-3A | 76.11 | −1.75 | 0.21 | 49.02 | −2.57 | −8.52 | 49.15 | −0.06 | 0.65 |
| 3B | 74.83 | −2.17 | −3.03 | 48.67 | −2.63 | −8.17 | 37.79 | 2.62 | 11.15 |
| CE-3B | 76.60 | −2.24 | −0.66 | 47.10 | −2.04 | −9.00 | 47.55 | 0.65 | 0.31 |
| 4A | 84.98 | −1.50 | 0.46 | 49.78 | −3.18 | −6.67 | 44.44 | −0.70 | −0.81 |
| CE-4A | 84.41 | −1.05 | 3.13 | 50.79 | −3.04 | −7.12 | 52.01 | −1.59 | −4.06 |
| 4B | 84.90 | −1.70 | −0.01 | 48.08 | −2.96 | −7.18 | 42.57 | −0.29 | −1.04 |
| CE-4B | 84.92 | −1.17 | 2.93 | 49.78 | −2.91 | −7.16 | 51.06 | −1.50 | −4.02 |

The reflected interior L* value of Examples 3A, 3B, 4A, and 4B is advantageously lower than CE-3A, CE-3B, CE-4A, and CE-4B.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

The invention claimed is:

1. A building comprising an architectural transparency, the architectural transparency comprising:

a glass substrate comprising a first surface and a second surface opposite the first surface; and a solar control coating applied over the second surface of the substrate, the solar control coating consisting of:

a first silicon aluminum nitride layer over at least a portion of the second surface of the substrate, wherein the first silicon aluminum nitride layer comprises a total thickness of 7.9 nm to 10.6 nm;

a nickel-chromium alloy layer over and in direct contact with at least a portion of the first silicon aluminum nitride layer; and a second silicon aluminum nitride layer over and in direct contact with at least a portion of the nickel-chromium alloy layer, wherein a ratio of the thickness of the first silicon aluminum nitride layer to the second silicon aluminum nitride layer is at least 1:2, wherein the nickel-chromium alloy layer is substantially free of nitrogen and oxygen, wherein the first silicon aluminum nitride layer and the second silicon aluminum nitride layer comprise from 10 wt. % to 20 wt. % aluminum, and wherein the transparency has an exterior reflective aesthetic (Rfb*) value measured from the uncoated side of the transparency ranging from −10 to −5.

2. The building of claim 1, wherein the solar control coating is the only coating applied over second surface of the substrate.

3. The building of claim 1, wherein the nickel-chromium alloy layer comprises an alloy of 70 weight percent to 90 weight percent nickel and 10 weight percent to 30 weight percent chromium.

4. The building of claim 1, wherein the nickel-chromium alloy layer comprises a thickness in the range of 1 nanometer to 10 nanometers.

5. The building of claim 1, wherein the ratio of the thickness of the first silicon aluminum nitride layer to the thickness of the nickel-chromium alloy layer to the thickness of the second silicon aluminum nitride layer is 1-5:1:3-22.

6. The building of claim 1, wherein the ratio of the thickness of the first silicon aluminum nitride layer to the thickness of the nickel-chromium alloy layer to the thickness of the second silicon aluminum nitride layer is 1-4:1:4-20.

7. The building of claim 1, wherein the total thickness of the first silicon aluminum nitride layer and the nickel-chromium alloy layer is less than 25 nanometers.

8. The building of claim 1, wherein the ratio of the thickness of the first silicon aluminum nitride layer to the thickness of the second silicon aluminum nitride layer is least 1:3.

9. The building of claim 1, wherein the ratio of the thickness of the first silicon aluminum nitride layer to the thickness of the second silicon aluminum nitride layer is at least 1:4.

10. The building of claim 1, wherein the reflected interior L* value is not greater than 46, as measured from the surface comprising the solar control coating.

11. The building of claim 1, wherein the internal light reflection is less than 16 percent, as measured from the surface comprising the solar control coating.

12. The building of claim 1, wherein the architectural transparency is tempered.

13. The building of claim 1, wherein the second silicon aluminum nitride layer comprises a total thickness of 25 nm to 58 nm.

14. The building of claim 1, wherein the transparency has an exterior reflective aesthetic (Rfa*) value measured from the uncoated side of the transparency ranging from −4 to −2.

\* \* \* \* \*